Jan. 16, 1951 P. M. MUELLER 2,538,584
SPOOL
Filed March 1, 1945
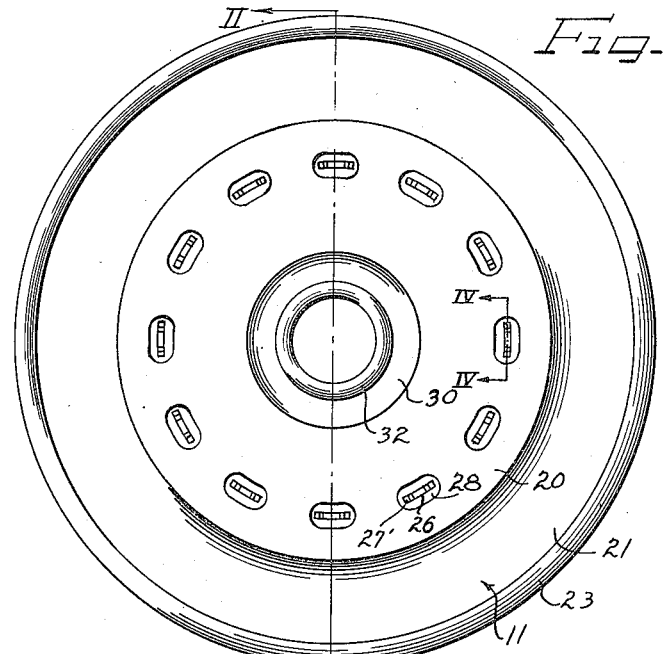
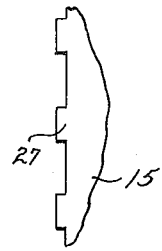
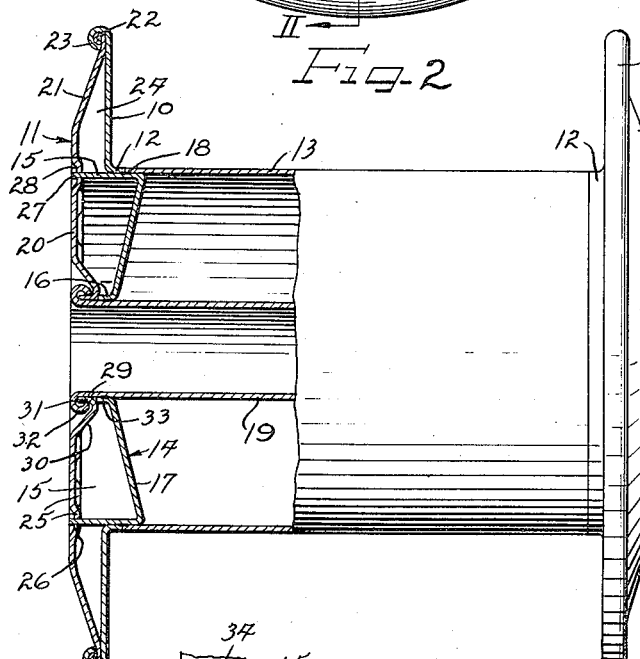
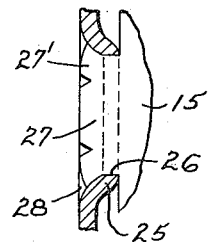
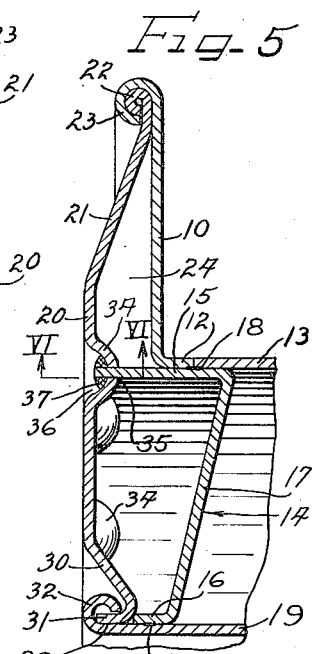
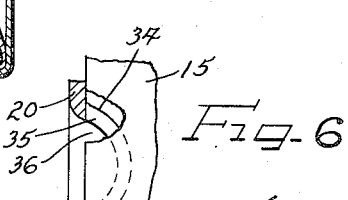
Inventor
Paul M. Mueller
by The Firm of Charles H. Kidd Attys Patented Jan. 16, 1951

2,538,584

UNITED STATES PATENT OFFICE 2,538,584

SPOOL

Paul M. Mueller, Rome, N. Y., assignor to Hubbard Spool Company, Chicago, Ill., a corporation of Illinois Application March 1, 1945, Serial No. 580,373

3 Claims. (Cl. 242—123)

This invention relates to spools constructed entirely of sheet metal and adapted particularly for carrying heavier material such as wire, the general object of the invention being to produce a comparatively light spool with the various sheet metal parts so arranged and secured together as to cooperate to produce a strong and durable spool capable of resisting the heavy service under which it is used.

An important object is to produce a spool of comparatively light sheet metal parts in which the head or end structures for the spool barrel element are substantially in the form of king trusses whereby to provide rigidity for preventing flaring or spreading of the head structures by the wire loaded thereon.

Other objects of the invention are to provide simplified efficient means for securing and holding various parts of the spool intimately together in assembled relation.

The various objects and features of the invention will be apparent from the structure shown on the drawings, in which:

Figure 1 is an end view of the spool;

Figure 2 is a view partly in elevation and partly in section on plane II—II of Figure 1;

Figure 3 is a view of a portion of one of the reinforcing elements showing the arrangement of tongues thereon;

Figure 4 is an enlarged section on plane IV—IV Figure 1;

Figure 5 is a section of a portion of a spool showing a modified arrangement; and Figure 6 is an enlarged section on plane VI—VI Figure 5.

On the spool shown, each head structure comprises an inner radially extending wall 10 and an outer wall 11. The inner walls 10 have open centers with the surrounding metal portions deflected inwardly to form cylindrical flanges 12 which constitute the end portions of a tubular barrel element, the body portion 13 of which extends between the flanges in abutting engagement with the inner ends thereof. For holding the flanges 12 and the barrel part 13 together and in alignment, sheet metal hub frames 14 are provided which are of annular cup shape providing the outer cylindrical walls 15 and the inner cylindrical walls 16, the bottom walls 17 inclining outwardly. The walls 15 are of outer diameter to fit intimately in the flanges 12 and the adjacent end portions of the barrel part 13, the flanges and the barrel ends being preferably welded to the outer walls 15 as indicated at 18. The inner walls 16 of the frames 14 are of diameter to receive the end portions of an arbor tube 19.

The outer wall 11 of each head structure is formed integrally of sheet metal and comprises the body portion 20 and the surrounding outer frusto-conical portion 21 whose peripheral portion 22 is curled around outwardly to be received and clamped in the outwardly curled peripheral portion 23 of the inner wall 10. With this arrangement the outer wall is separated from the inner wall by a space 24. The outer cylindrical wall 15 extends outwardly beyond the inner wall 10 to span the space 24 and to be secured to the outer wall part 20. In the arrangement shown on Figures 1 to 4, one manner of securing the frame 14 to the outer wall is shown. The wall portion 20 is deflected inwardly at spaced intervals to form a circle of projections or beads 25 on the inner side of the wall portion 20, these beads being elongated and disposed opposite the end of the outer wall 15 of the frame 14 to be abutted thereby. The deflections 25 have slots 26 therein and, as best shown on Figure 3, the wall 15 has tongues 27 thereon which project through the slots into the concavities 28 of the deflected portions. The projecting ends of the tongues may be deflected over laterally against the sides of the recesses 28, or, as best shown on Figure 4, the projecting tongue ends may be notched and their side portions 27' deflected over into engagement with the inclined end walls of the recesses 28 to thus joint the wall 15 to the end wall body 20. After such deflecting or riveting, the tongue ends will be entirely within the recesses 28 to leave the outer surface of the wall portion 20 smooth for stacking or supporting of the spool on end.

The end walls 11 have the axial openings 29 therethrough, the metal surrounding these openings being first deflected inwardly as indicated at 30 and then outwardly as indicated at 31. The arbor tube 19 extends through the openings surrounded by the inner walls 16 of the frames 14, and through the openings 29 in the end walls 11, the end portions of the arbor tube being then curled inwardly, as indicated at 32, to intimately receive the outwardly turned portions 31 surrounding the openings 29. The arbor tube 19 is secured to the inner walls 16 of the frames 14 as by welding indicated at 33. The curled ends 32 of the arbor tube are inside of the outer faces of the outer wall portions 20 so as not to interfere with the stacking or seating of the spools.

It will be noted that with the outer and inner walls 10 and 11 and the frame 14 arranged and secured together as shown, each head structure of the spool is, in effect, a king truss of which the outer wall 15 of the frame 14 forms the connecting post between the outer wall 11 forming the outer truss member and the inner wall 10 and the bottom wall 17 of the frame 14 forming the inner truss member. With the truss structure heads connected by the barrel element 13 and the arbor 19, the head structures will be held rigid and braced against flaring or spreading under axial pressure of wire loaded on the spool.

Figure 4 shows a modified arrangement for securing the end wall of the spool head structure to the outer wall 15 of the frame 14. As shown, the deflected portions of the outer wall body 20 form beads 34 arcuately spaced which are of semispherical shape and have the slots 35. The outer wall 15 of the frame 14 does not have tongues thereon as in the arrangement of Figures 1 to 4, but the outer edge of the wall 15 remains continuous and abuts against the inner side of the wall portion 20 with the end of the wall 15 extending through the slots 35 into the recesses 36 of the beads. These portion of the wall 15 projecting into and exposed in the recesses 36 may be deflected over against the bottoms of the recesses to thus secure the end wall to the frame 14, but preferably the projecting portions are welded or fused to the bead walls as indicated at 37. It is evident that, in the arrangement of Figure 1 to 4, the ends of the tongues 27, instead of being burred or staked over, could be welded or fused to the wall 11 to secure the wall to the frame 14.

I have thus produced an efficient spool of a minimum number of parts of comparatively light sheet metal relatively arranged and rigidly secured together to provide truss formation for the heads whereby the spool will maintain its proper shape during winding or unwinding thereof or during handling or shipment.

I have shown a practical and efficient embodiment of the various features of my invention, but I do not desire to be limited to the exact construction and arrangement shown and described, as changes and modifications may be made without departing from the scope of the invention as defined in the appended claims.

I claim as my invention:

1. A spool for the purpose described comprising a tubular barrel element having end walls extending in radial planes, annular hub frames having outer walls fitting into the ends of said barrel element and having inner walls defining aligned passageways, said outer walls projecting a distance beyond the ends of the barrel element, reinforcing walls outside of said end walls spaced away therefrom and having portions thereof deflected inwardly and being slotted, the outer ends of said outer walls of said hub frames abutting said reinforcing walls and projecting through said slots and the projecting portions being secured to the outer sides of the reinforcing walls, the outer portions of said reinforcing walls inclining inwardly to the peripheral portions of said end walls and being secured thereto, said reinforcing walls having openings in register with the aligned passageways of said hub frames, and an arbor tube extending through said aligned openings and the openings in said reinforcing walls and being deflected at its ends backwardly against said reinforcing walls.

2. An all sheet metal spool for the purpose described comprising a tubular barrel element having end walls extending in radial planes, annular hub frames having outer walls fitting into the ends of the barrel element and inner walls defining aligned passageways, said barrel element being welded to said hub frame outer walls, said hub frame outer walls projecting a distance beyond said end walls, reinforcing walls for said end walls abutting the projecting ends of said hub frame outer walls and having portions thereof deflected inwardly and slotted to receive corresponding portions of said hub frame outer walls and said portions being secured against the outer sides of said reinforcing walls, the outer portions of said reinforcing walls inclining inwardly to the peripheral portions of said end walls and being secured thereto, said reinforcing walls having openings in register with the aligned passageways of said hub frames, and an arbor tube extending through said reinforcing wall openings and said aligned openings and having its end portions secured to said reinforcing walls.

3. In a sheet metal spool, head structures each in the form of a truss comprising an inner wall structure including an inner wall and a hub frame and an outer wall structure, said wall structures being spaced axially apart and having aligned axial openings therethrough, said inner wall structure having an outer part in a radial plane and an inner part inclining outwardly to the outer wall structure, the outer part of said outer wall structure being inclined inwardly and secured at its periphery to the periphery of said radial part of the inner wall structure, an annular wall extending in axial direction to span the space between said outer wall structure and the inner end of the radial part of the inner wall structure and being secured to the inner and outer wall structures, a barrel tube extending between and secured at its ends to the inner wall structure to form with said radial wall portion the annular space between the head structures for receiving material to be supported by the spool, and an arbor tube extending through the barrel tube and through the axial openings of said inner and outer wall structures and secured to said inner and outer wall structures.

PAUL M. MUELLER.

REFERENCES CITED

The following references are of record in the file of this patent:

UNITED STATES PATENTS

| Number | Name | Date |
| --- | --- | --- |
| 1,635,495 | Odquist | July 12, 1927 |
| 1,845,741 | Boesel | Feb. 16, 1932 |
| 2,229,584 | Olson | Jan. 21, 1941 |
| 2,264,029 | Olson | Nov. 25, 1941 |
| 2,321,084 | Howsom et al. | June 8, 1943 |

FOREIGN PATENTS

| Number | Country | Date |
| --- | --- | --- |
| 16,850 | Great Britain | of 1903 |